(12) United States Patent
Hiller

(10) Patent No.: US 7,395,353 B1
(45) Date of Patent: Jul. 1, 2008

(54) METHOD AND APPARATUS FOR PROCESSING INTERNET SITE NAMES THROUGH REGULAR EXPRESSION COMPARISON

(75) Inventor: Dean Hiller, Shrub Oak, NY (US)

(73) Assignee: Telleo, Incorporated, San Jose, CA (US)

( * ) Notice: Subject to any disclaimer, the term of this patent is extended or adjusted under 35 U.S.C. 154(b) by 1087 days.

(21) Appl. No.: 09/457,420

(22) Filed: Dec. 7, 1999

(51) Int. Cl.
*G06F 15/16* (2006.01)

(52) U.S. Cl. .................... 709/245; 709/200; 709/203

(58) Field of Classification Search ................ 709/200, 709/203, 206, 245; 707/101, 3; 345/733, 345/440; 713/200
See application file for complete search history.

(56) References Cited

U.S. PATENT DOCUMENTS

| | | | | |
|---|---|---|---|---|
| 5,434,974 | A * | 7/1995 | Loucks et al. | 707/101 |
| 6,035,326 | A * | 3/2000 | Miles et al. | 709/206 |
| 6,038,601 | A * | 3/2000 | Lambert et al. | 370/468 |
| 6,185,598 | B1 * | 2/2001 | Farber et al. | 709/200 |
| 6,286,047 | B1 * | 9/2001 | Ramanathan et al. | 345/733 |
| 6,336,138 | B1 * | 1/2002 | Caswell et al. | 345/440 |
| 6,338,082 | B1 * | 1/2002 | Schneider | 709/203 |
| 6,345,361 | B1 * | 2/2002 | Jerger et al. | 713/200 |
| 2002/0143991 | A1 * | 10/2002 | Chow et al. | 709/245 |
| 2004/0044791 | A1 * | 3/2004 | Pouzzner | 709/245 |

OTHER PUBLICATIONS

Author unknown, DNS, http://www.webopedia.com, May 1998, 3 pages.
Ornan Eres et al., DNS—The Domain Name System, Tel-Aviv University, http://www.rad.com/networks/1998/dns/welcome.htm, Sep. 1998, 15 pages.
Kristen Windbigler, Exploring the Domain Name Space, http://www.hotwired.lycos.com/webmonkey/geektalk/9/7/03/index4a.html, Jan. 24, 1997, 4 pages, especially page 3.
Author unknown, Cisco DistributedDirector 2500 Series Installation and Configuration Guide, Chapter 1: Overview of the Cisco DistributedDirector 2500 Series, Dec. 1997, 1-1 thur. 1-12.
Author unknown, Cisco DistributedDirector 2500 Series Installation and Configuration Guide, Chapter 6:Configuring DNS Caching name server mode, Dec. 1997, p. 6-1 thur. 6-18, especially 6-6.
Author unknown, "regular expression", Webcom Online Users Guide, http://www.webcom.com, Jan. 1999, 3 pages, especially p. 2-3.

* cited by examiner

*Primary Examiner*—Doug Hutton
*Assistant Examiner*—Nguyen Chau
(74) *Attorney, Agent, or Firm*—Kenyon & Kenyon LLP

(57) ABSTRACT

A method and apparatus is presented where similar Internet site names are handled in an improved manner at a Domain Name Server. In one example, a first site name from a computer system coupled to the Internet is compared to a variety of site names through a regular expression comparison. Thus, a site that has a number of similar site names (and potentially new site names that will have a similar format) will be better able to handle attempted accesses to site names that should logically go to its site.

17 Claims, 2 Drawing Sheets

METHOD AND APPARATUS FOR PROCESSING INTERNET SITE NAMES THROUGH REGULAR EXPRESSION COMPARISON

FIELD OF THE INVENTION

The present invention pertains to network communications. More particularly, the present invention pertains to the processing of network addresses and site names (such as those found in the Internet) using regular expressions.

BACKGROUND OF THE INVENTION

A network system includes a number of computer systems and local networks connected in such a manner to allow communication between them. The Internet, which includes the so-called World Wide Web, is an example of a global network system. A computer system coupled to the Internet (e.g., via a dial-up connection to an Internet Service Provider (ISP)) may communicate with any of the computer systems coupled in the Internet system. In other words, data, such as a request for information, may be directed to a particular computer system on the Internet.

Because of the number of computer systems in the network, a system is present to properly route data communicated by one computer system to another. This is assisted in the Internet system with a plurality of Domain Name Servers. These servers communicate directly with a subset of the servers that are coupled in the Internet system. When a first computer seeks to send data intended for a second computer, a request is made to a first Domain Name Server to find the address of the second computer system on the Internet. As is known in the Internet art, the second computer system is identified by a unique site name such as something having the form "abrainc.com." The first Domain Name Server that receives the request from the first computer system checks its stored site name information to see if there is an exact match for the "abrainc.com" character stream. If there is not a match, the first DNS sends a responsive message back to the first computer system. If there is a match, the first DNS forwards the request to another DNS where a similar comparison between the "abrainc.com" string and those strings stored at the DNS. If there is a match at this DNS, associated with the match is a detailed Internet address (typically a string of numbers and periods) that is sent back to the first computer system. After the Internet address is supplied to the first computer system, the first computer system then sends its data, request, etc. to the second computer. Through this system, data, requests, etc. are forwarded between nodes in the Internet until it reaches its destination.

In actuality, each unique Internet site name has associated with it a numerical Internet address. The DNS system is a hierarchical system. There are a small number of root DNSs which are responsible for tracking the top level domains such as .com, .net, .edu, etc. These servers are instrumental in identifying valid site names. The system for locating properly addressed computer systems is a very robust system. The goal of the system is to forward requests to server systems that are more knowledgeable about the appropriate location of the DNS. The information that is stored in the DNSs is repeatedly updated so that future requests to a particular site name can be properly handled.

One problem associated with this system is in how it handles similar site names (i.e., site names that have a similar number of characters or have character strings that are in common). In the art, similar site names are handled in exactly the same manner as for every other site name. In other words, though similar site names may be directed to the same computer system, the DNS system must be updated for each and every site name to the computer system. This leads to inefficiency, in that it takes some time for the DNS system to be updated with the correct information so that newly created site names can be quickly located for communication.

SUMMARY OF THE INVENTION

This and other problems are addressed by the method and apparatus of the present invention. According to an embodiment of the present invention a Domain Name Server is modified so as to use a regular expression in the comparison between the requested site name and the series of similar site names (whether actual or potential) associated with a computer system.

DETAILED DESCRIPTION

Figure 1:
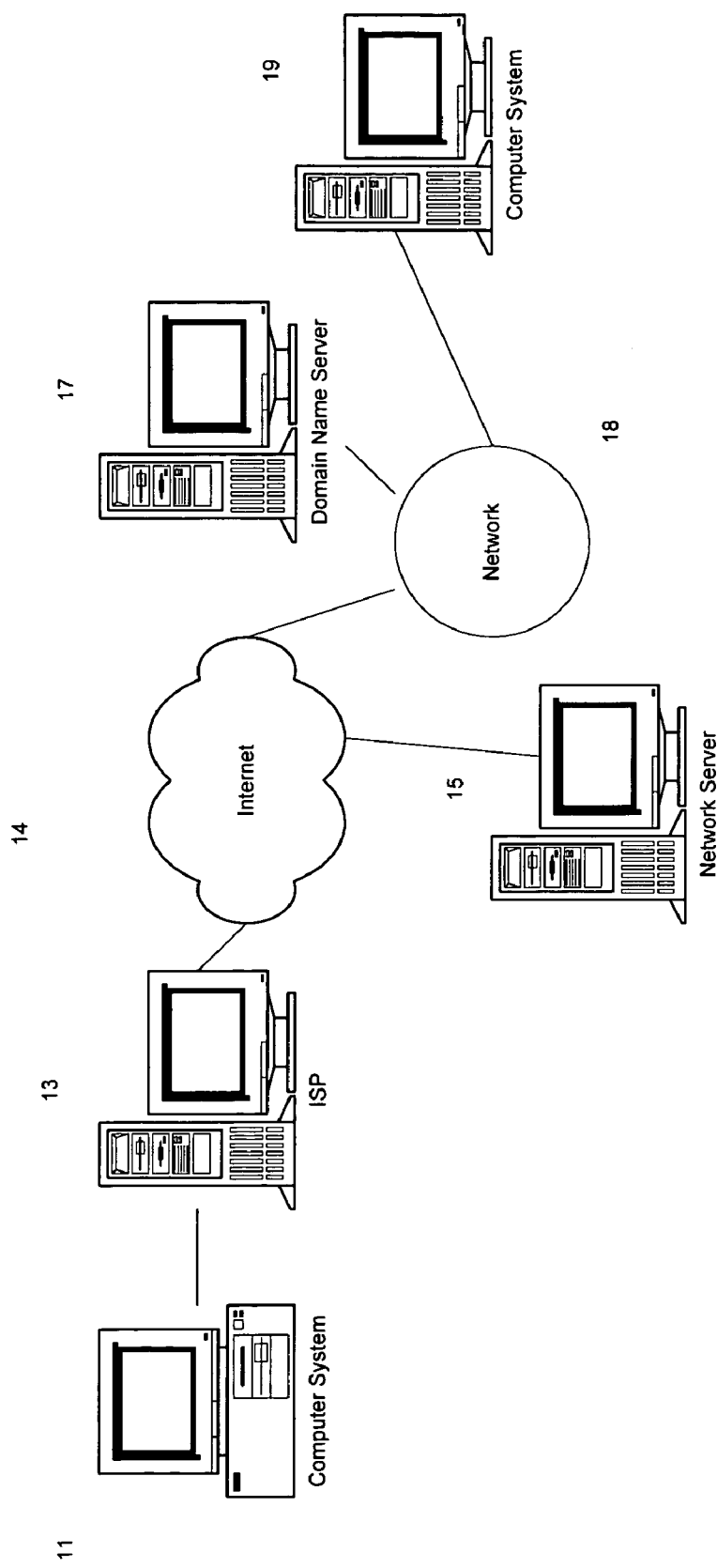
FIG. 1 is a block diagram of a computer network system operated according to an embodiment of the present invention.

Referring to FIG. 1, a computer network that may be operated according to an embodiment of the present invention is shown. In this system, a first computer system 11 seeks to communicate with a second computer system 19. In doing so, it seeks to send some sort of information which will be referred to herein as "data" to a first site name which may be associated with computer system 19. In this example, the first site name is similar to a plurality of other site names and is prone for searching using a regular expression for comparison purposes as described in further detail below. For the purposes of this embodiment, the site name is as follows: 4085551234.abrainc.com (e.g., a U.S. telephone number with an "abrainc" sub-domain and a ".com" domain).

The first site name is communicated, for example, by the first computer system 11 to an Internet Service Provider (ISP) 13. The ISP 13 then transfers the site name to a Network Server 15 (e.g., over Internet 14). As known in the art, this Network Server may be a root Domain Name Server which is responsible for knowing valid site names in the ".com" realm. Once Network Server 15 identifies a valid ".com" site name (i.e., the "abrainc.com" portion of the site name), the site name is eventually forwarded to the Internet and preferably is forwarded to Domain Name Server 17 to determine if 4085551234.abrainc.com is a valid site name (e.g., via a network node 18).

Figure 2:
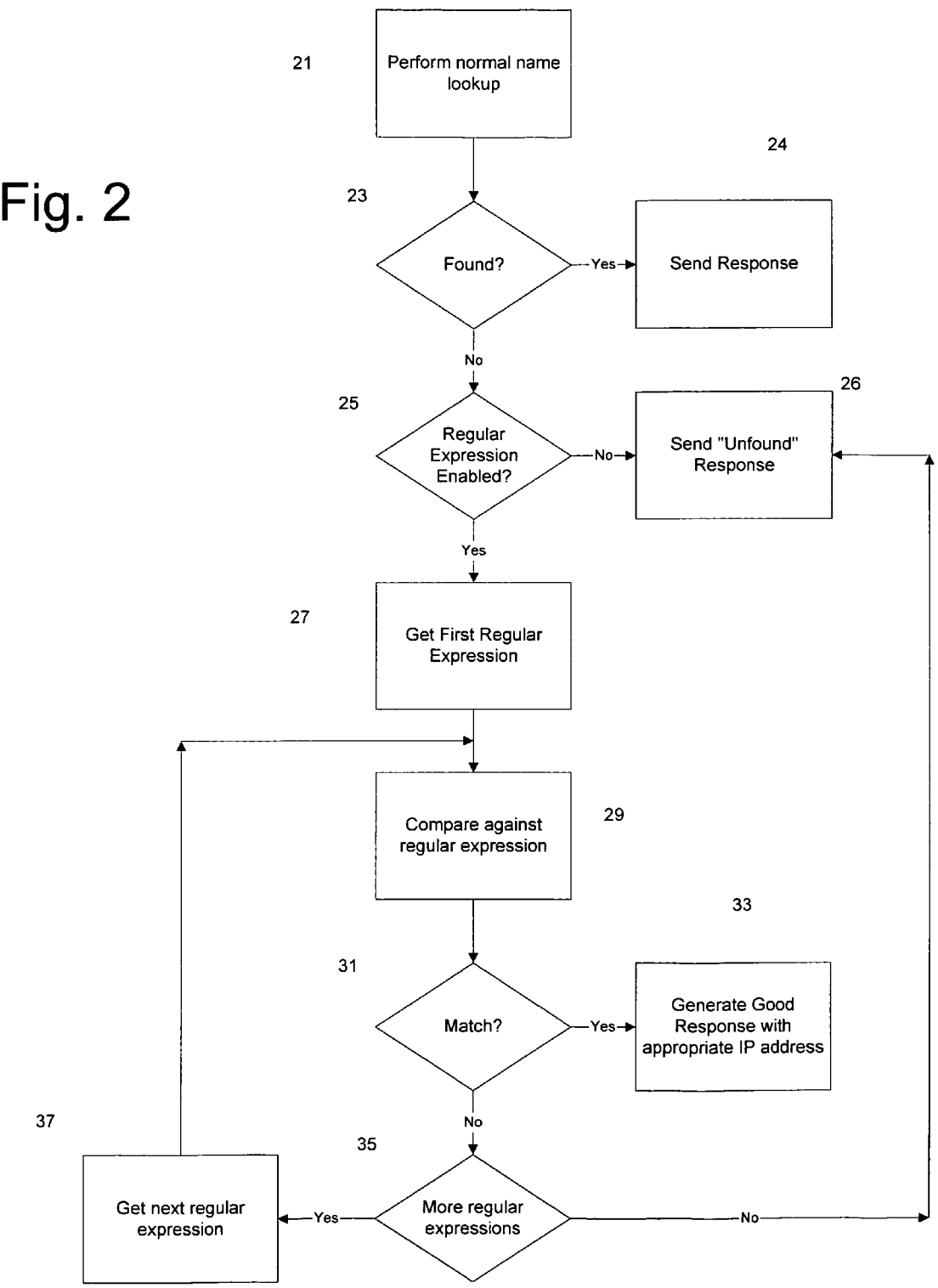
FIG. 2 is a flow diagram of a method for operating a computer system of FIG. 1 according to an embodiment of the present invention.

Referring to FIG. 2, a method of the present invention is shown in flow diagram form. In block 21, a normal name lookup is performed where the first site name is compared to the site names that are stored at the DNS 17. At decision block 23 it is determined whether a match has been found. If one has, control passes to block 24 where an appropriate response is sent by the DNS 17 to first computer system 11. If no match is found, control passes to decision block 25 where it is determined whether regular expression comparisons are enabled at the DNS 17. If they are not, then control passes to block 26 where an "unfound" message or the like is sent back to first computer system 11 (FIG. 1).

If regular expression comparisons are enabled, control passes to block 27 where a first regular expression is retrieved (e.g., from memory at DNS 17). According to an embodiment of the present invention, the first regular expression can have a form such as ^\d{10}$.X.Y where ^\d{10}$ represents a string of ten numbers, X represents a sub-level domain ("abrainc" in this example), and Y represents a top-level domain ("com" in this example). An alternative regular expression could be ^[0-9]+$.X.Y where ^[0-9]+$ represents a string of numbers (each between 0 and 9). In block 29 a comparison is made between the first site name and the regular expression. Such a comparison can be done, for example using a comparison procedure such as that which is used in the UNIX operating system. In this embodiment, the regular expressions set forth above are in a UNIX format. One skilled in the art based on the above teaching will appreciate that other formats may be used to represent a regular expression. In decision block 31, it is determined whether there is a match. If there is, then control passes to block 33 where a good response is sent to first computer system 11 with an appropriate Internet Protocol (IP) address. If there is not a match, then control passes to decision block 35 to determine whether other regular expressions exist. If there are no additional regular expressions present at DNS 17, then control passes to block 26 where an "unfound" message or the like is sent to computer system 11. If there are additional regular expressions, then control passes to block 37 to retrieve the next regular expression and pass control to block 29 to perform the next comparison.

Although several embodiments are specifically illustrated and described herein, it will be appreciated that modifications and variations of the present invention are covered by the above teachings and within the purview of the appended claims without departing from the spirit and intended scope of the invention. For example, Network Server 15 as a Domain Name Server may be modified to include a regular expression comparison as described above with reference to FIG. 1. In addition, other Domain Name Servers may be modified to include the regular expression method described above.

For example, the root Domain Name Server for a particular country may be used to perform the regular expression comparison. Accordingly, assuming that Z is a valid country code (i.e., a geographically-oriented top-level domain), all site names including that root are directed to the Domain Name Server for that country. Thus, modifying the regular expression above to ^\d{10}$.Z would result in the data being sent to the root Domain Name Server and that server determining that the site name is valid at that location. One skilled in the art will appreciate that other regular expressions may be used. For example regular expressions may be used which recognizes a string of alpha-numeric characters in the first site name.

What is claimed is:

1. A method of processing an Internet site name comprising:
   retrieving a regular expression stored at a Domain Name Server; and
   performing a comparison between a first Internet site name and the regular expression at the Domain Name Server to identify an Internet Protocol address for multiple similar site names.

2. The method of claim 1 further comprising:
   transmitting said first Internet site name from a first computer system to said Domain Name Server over the Internet.

3. The method of claim 2 further comprising:
   transmitting a responsive message to said first computer system if a match is found in said regular expression comparison.

4. The method of claim 1 wherein said regular expression uses a UNIX regular expression format.

5. The method of claim 4 wherein said regular expression has a format ^\d{10}$.X.Y where ^\d{10}$ represents a string often numbers, X represents a sub-level domain and Y represents a top-level domain.

6. The method of claim 4 wherein said regular expression has a format ^[0-9]+$.X.Y where ^[0-9]+$ represents a string of numbers, X represents a sub-level domain and Y represents a top-level domain.

7. The method of claim 4 wherein said regular expression has a format ^\d{10}$.Z where ^\d{10}$ represents a string of ten numbers, and Z represents a geographically oriented top-level domain.

8. The method of claim 4 wherein said regular expression has a format ^[0-9]+$.Z where ^[0-9]+$ represents a string of numbers, and Z represents a geographically oriented top-level domain.

9. An apparatus for processing an Internet site name comprising:
   a Domain Name Server adapted to retrieve a regular expression stored therein and perform a comparison between a first Internet site name and the regular expression to identify an Internet Protocol address for multiple similar site names.

10. A set of instructions residing in a storage medium, said set of instructions capable of being executed by a processor to implement a method of processing an Internet site name, the method comprising:
    retrieving a regular expression stored at a Domain Name Server; and
    performing a comparison between a first Internet site name and the regular expression at the Domain Name Server to identify an Internet Protocol address for multiple similar site names.

11. The set of instructions of claim 10, the method further comprising:
    transmitting said first Internet site name from a first computer system to said Domain Name Server over the Internet.

12. The set of instructions of claim 11, the method further comprising:
    transmitting a responsive message to said first computer system if a match is found in said regular expression comparison.

13. The set of instructions of claim 10 wherein said regular expression uses a UNIX regular expression format.

14. The set of instructions of claim 13 wherein said regular expression has a format ^\d{10}$.X.Y where ^\d{10}$ represents a string often numbers, X represents a sub-level domain and Y represents a top-level domain.

15. The set of instructions of claim 13 wherein said regular expression has a format ^[0-9]+$.X.Y where ^[0-9]+$ represents a string of numbers, X represents a sub-level domain and Y represents a top-level domain.

16. The set of instructions of claim 13 wherein said regular expression has a format ^\d{10}$.Z where ^\d{10}$ represents a string of ten numbers, and Z represents a geographically oriented top-level domain.

17. The set of instructions of claim 13 wherein said regular expression has a format ^[0-9]+$.Z where ^[0-9]+$ represents a string of numbers, and Z represents a geographically oriented top-level domain.

* * * * *

UNITED STATES PATENT AND TRADEMARK OFFICE
CERTIFICATE OF CORRECTION

| | |
|---|---|
| PATENT NO. | : 7,395,353 B1 |
| APPLICATION NO. | : 09/457420 |
| DATED | : July 1, 2008 |
| INVENTOR(S) | : Dean Hiller |

It is certified that error appears in the above-identified patent and that said Letters Patent is hereby corrected as shown below:

| Column | Line | |
|---|---|---|
| 4 | 5 | Change "often" to --of ten--. |
| 4 | 51 | Change "often" to --of ten--. |

Signed and Sealed this

Thirtieth Day of June, 2009

JOHN DOLL
*Acting Director of the United States Patent and Trademark Office*